(12) United States Patent
Marsden et al.

(10) Patent No.: US 9,320,080 B2
(45) Date of Patent: *Apr. 19, 2016

(54) WIRELESS MASTER-SLAVE DISTRIBUTED COMMUNICATIONS NETWORK

(71) Applicant: Koninklijke Philips Electronics N.V., Eindhoven (NL)

(72) Inventors: Ian A. Marsden, Redhill (GB); Paul R. Marshall, Salfords (GB)

(73) Assignee: Koninklijke Philips N.V., Eindhoven (NL)

( * ) Notice: Subject to any disclaimer, the term of this patent is extended or adjusted under 35 U.S.C. 154(b) by 439 days.

This patent is subject to a terminal disclaimer.

(21) Appl. No.: 13/715,462

(22) Filed: Dec. 14, 2012

(65) Prior Publication Data

US 2013/0107770 A1    May 2, 2013

Related U.S. Application Data

(63) Continuation of application No. 10/145,665, filed as application No. PCT/IB02/01620 on May 8, 2002, now Pat. No. 8,359,051.

(30) Foreign Application Priority Data

May 17, 2001    (GB) .................................. 0112017.9

(51) Int. Cl.
*H04B 7/00* (2006.01)
*H04W 84/20* (2009.01)
(Continued)

(52) U.S. Cl.
CPC ................ *H04W 84/20* (2013.01); *H04W 8/26* (2013.01); *H04W 88/04* (2013.01)

(58) Field of Classification Search
CPC ..... H04W 92/02; H04W 84/20; H04W 88/04; H04W 8/26; H04W 40/00
USPC ............ 370/310, 351, 395.31, 408, 256, 254, 370/258; 455/41.1–41.3
See application file for complete search history.

(56) References Cited

U.S. PATENT DOCUMENTS

| 4,792,946 A | 12/1988 | Mayo |
| 4,939,726 A | 7/1990 | Flammer et al. |

(Continued)

FOREIGN PATENT DOCUMENTS

| JP | 6053891 A | 2/1994 |
| JP | 6177912 A | 6/1994 |

(Continued)

OTHER PUBLICATIONS

Bhagwat et al., A Routing Vector (RVM) for Routing in Bluetooth Scatternets, IEEE, Nov. 15, 1999, pp. 375-379.*

(Continued)

*Primary Examiner* — Nay A Maung
*Assistant Examiner* — Angelica M Perez

(57) ABSTRACT

A master-slave distributed communications network includes a master node, a plurality of slave nodes. Each slave node is configured to store an address of the next node for a message to be routed on an uplink to the master node, and when sending a data packet to the master node it appends the pre-stored address and forwards the data packet to the next node thus lengthening the data packet, as the data packet is progressed from the slave nodes to the master node. For a downlink message, the master node using a pre-stored routing table includes in the data packet the addresses of all the slave nodes on the selected route. As the data packet is progressed from slave node to slave node, the address of each slave node which has forwarded the data packet is deleted thus shortening the overall length of the data packet.

58 Claims, 2 Drawing Sheets

(51) Int. Cl.
*H04W 8/26* (2009.01)
*H04W 88/04* (2009.01)

(56) References Cited

U.S. PATENT DOCUMENTS

| | | | |
|---|---|---|---|
| 5,115,433 | A | 5/1992 | Baran et al. |
| 5,295,154 | A | 3/1994 | Meier et al. |
| 5,369,784 | A * | 11/1994 | Nelson .......................... 455/503 |
| 5,434,490 | A | 7/1995 | Ishida et al. |
| 5,479,400 | A | 12/1995 | Dilworth et al. |
| 5,488,608 | A | 1/1996 | Flammer, III |
| 5,757,783 | A | 5/1998 | Eng et al. |
| 5,815,668 | A | 9/1998 | Hashimoto |
| 5,874,903 | A | 2/1999 | Shuey et al. |
| 5,920,267 | A | 7/1999 | Tattersall et al. |
| 5,974,236 | A | 10/1999 | Sherman |
| 5,987,011 | A | 11/1999 | Toh |
| 6,160,795 | A * | 12/2000 | Hosemann .................... 370/256 |
| 6,249,516 | B1 * | 6/2001 | Brownrigg et al. ........... 370/338 |
| 6,590,867 | B1 | 7/2003 | Ash et al. |
| 6,775,258 | B1 | 8/2004 | Van Valkenburg et al. |
| 8,359,051 | B2 * | 1/2013 | Marsden et al. .............. 455/500 |

FOREIGN PATENT DOCUMENTS

| | | | |
|---|---|---|---|
| JP | 9083528 | A | 3/1997 |
| JP | 11509992 | A | 8/1998 |
| JP | 2001237764 | A | 8/2001 |
| WO | 9955031 | A1 | 10/1999 |

OTHER PUBLICATIONS

Yamazaki et al, "An Ad-Hoc Routing Protocol in Sensor Networks", School of Engineering, The University of Tokyo, 2000, p. 572.

Lee et al, "On-Demand Multicast Routing Protocol" IEEE, 1999, p. 1298-1302.

Perkins et al, "Ad-Hoc On-Demand Distance Vector Routing", Mobkle Computing Systems and Applications, 1999, 12 Pages.

Bhagwat et al, "A Routing Vector Method (RVM) for Routing in Bluetooth Scatternets", International Workshop on Mobile Multimedia Communications, Nov. 15, 1999, pp. 375-379.

Jubin et al, "The DARPA Packet Radio Network Protocols", Proceedings of THEIEEE, vol. 75, No. 1, 1987, pp. 21-32.

Netcomm Presentation, Jun. 17, 1994, pp. 1-20.

Fitzpatrick, "Netcomm Matures as Advanced Communication and Metering System", Southern California Edison, Research Newsletter, vol. 19, No. 4, 1990, pp. 1-8.

Kahn et al, "Advances in Packet Radio Technology", Proceedings of the IEEE, vol. 66, No. 11, 1978, p. 1468-1496.

* cited by examiner

WIRELESS MASTER-SLAVE DISTRIBUTED COMMUNICATIONS NETWORK

All the domestic and foreign priority documents cited in this application are hereby incorporated in whole by reference.

TECHNICAL FIELD

The present invention relates to a wireless master-slave distributed communications network having particular, but not exclusive, application to multiple hop radio control networks, such as networks for the control of street lighting, and multiple hop radio monitoring networks.

BACKGROUND ART

Multiple hop radio networks typically comprise a master device or node which stores a routing table of the links between the master device and slave devices or nodes. Such networks have been found to be difficult to install and configure in an optimum manner. Complete knowledge of the network and its loading is usually essential. Also it has been necessary to preprogram into a slave device every anticipated communication path that a user of the slave device may require. Thus the quality of a network and its installation is dependent on the competency of the installer. Further any message being passed across the network to the master device from the outset needs to contain all of the addressing and routing information for the message to complete its route which in the case of several hops means that a data packet is long because of the need to include the addresses of all the slave nodes lying on the virtual route. In the field of low power data transmission it is known that shorter messages can be relayed more reliably across a network than longer messages. If the network changes, for example by the addition or removal of slave nodes, then information about these changes and their effects on the routing table have to be entered regularly on all the nodes. If a defined route fails due a slave node becoming defective then any slave nodes downstream of the affected slave node are orphaned until the problem is rectified by repairing the defective slave node or by allocating new routes the quality of which relies on an installer knowing the route to the respective slave devices.

As a consequence of these shortcomings multiple hop radio networks have not been widely used.

However with the advent of low cost radio solutions to many control and monitoring networks the interest in such networks is growing especially if the known shortcomings can be overcome.

DISCLOSURE OF INVENTION

It is an object of the present invention to enable multiple hop radio networks to adapt to changes on the networks. It is another object of the present invention to facilitate a new slave node joining a multiple hop radio network.

According to a first aspect of the present invention there is provided a master-slave distributed communications network comprising a master node and a plurality of slave nodes, the master node and the slave nodes being operatively interconnected, wherein each slave node has means for storing an address of the next node in a route of a message to the master node.

According to a second aspect of the present invention there is provided a method of operating a master-slave distributed network comprising a master node and a plurality of slave nodes, the master node and the slave nodes being operatively interconnected, wherein a slave node wishing to send a data packet to the master node includes in the data a prestored address of the next node in a route to the master node and transmits the data packet.

By means of a slave node storing the address of the next node in the routing plan, the network can be modified by the addition or removal of slave nodes without all the nodes having to be updated to record these changes in a pre-stored complete routing plan. The route from a slave node to the master node is dynamically determined which provides flexibility in the configuration of the network following any changes affecting it. Another beneficial feature is that the data packet is shortest for the first hop of a message being propagated towards a master node which means that the data packet is inherently more reliable to transmit.

The network is built-up originally from the master node which is not in direct communication with all of the slave nodes. Thus when a slave node is added to or removed from the network only those slave nodes in its vicinity are involved in routing decisions.

According to a third aspect of the present invention there is provided a slave station for use as a slave node in a master-slave distributed communications network including a master node and a plurality of slave nodes, the slave station comprising transceiving means for communicating with at least one of the master node and the plurality of slave nodes, first memory means for storing the address of the slave station, second memory means for storing the address of the next node in a route to the master node, and processing means coupled to the transceiving means and the first and second memory means for adding the address of the said next node to a data packet to be transmitted to the master node.

According to a fourth aspect of the present invention there is provided a master station for use in a master-slave distributed communications network including the master station and a plurality of slave stations, the master station comprising transceiving means for communicating with the plurality of slave stations, memory means for storing routing data, and processing means for compiling routing information from the stored routing data and for adding the compiled routing information to a data packet, the routing information comprising the address of a destination slave station and, where applicable, the address of the or each intermediate slave station(s) through which the data packet will be passed.

BRIEF DESCRIPTION OF DRAWINGS

The present invention will now be described, by way of example, with reference to the accompanying drawings, wherein.

In the drawings the same reference numerals have been used to indicate corresponding features.

MODES FOR CARRYING OUT THE INVENTION

Figure 1:
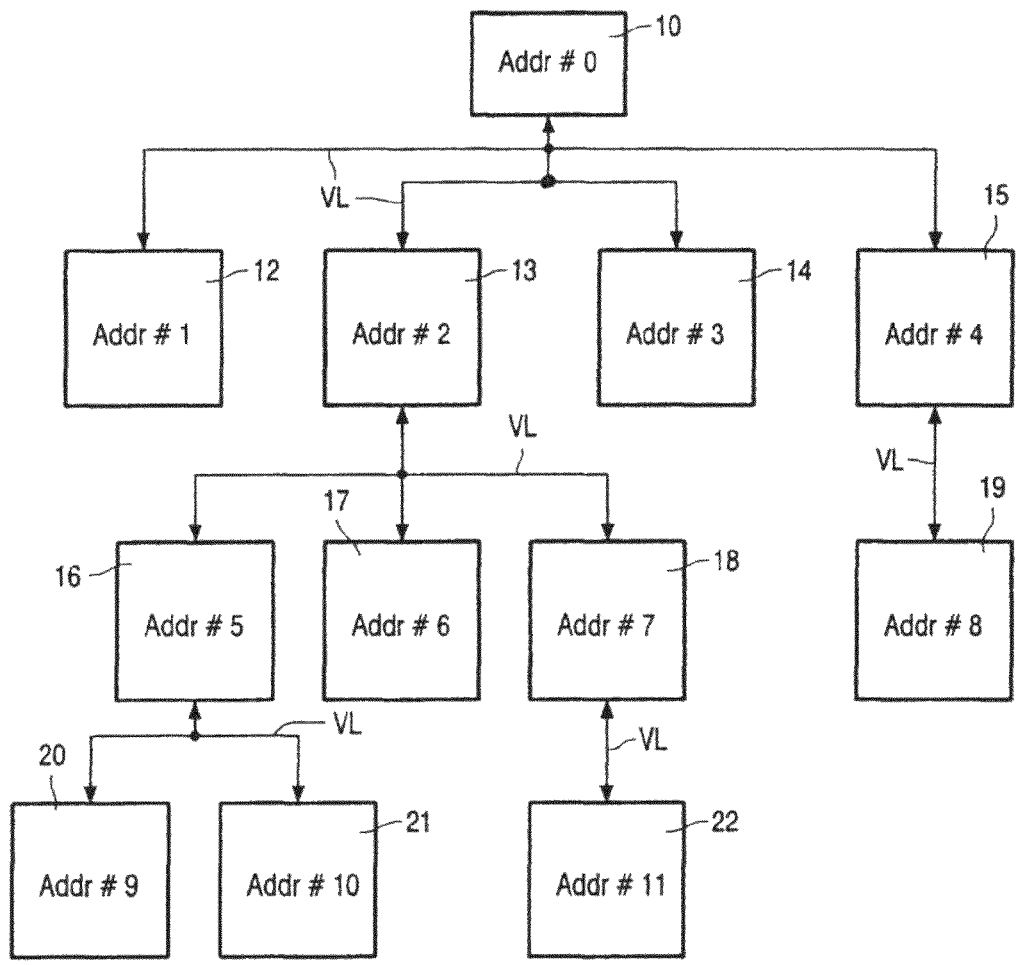
FIG. 1 is a diagrammatic representation of an embodiment of a multiple hop radio network.

The multiple hop radio network shown in FIG. 1 comprises a master device or node 10 and a plurality of slave devices or nodes 12 to 22 which directly or indirectly are operatively coupled to the master device by links VL. A routing table comprising the slave nodes 12 to 22 and the links VL is stored in the master device 10. The illustrated network may comprise a control network for street lighting. As shown the slave nodes 12, 13, 14 and 15 can communicate directly with the master device 10 whereas the slave nodes 16, 17 and 18 and the slave node 19 have to communicate in a first hop with the slave nodes 13 and 15, respectively, before being able to communicate with the master device 10. The slave nodes 20 and 21 and the slave node 22 have to communicate in a first hop with the slave nodes 16 and 18, respectively, and then in a second hop with the slave node 13 before being able to communicate with the master device 10.

The master device 10 has an address Addr#O and the slave nodes 12 to 22 have addresses Addr#1 to Addr#11, respectively. For convenience of reference, the links from the slave nodes 12, 13, 14 and 15 to the master device 10 are termed Route#O, where #0 is the address of the master device, and the links from the slave nodes 16, 17, 18 to the slave node 13 are termed Route#2, where #2 is the address of the slave node 13. Similarly the link from the slave node 19 to the slave node 15 is termed Route#4, the links from the slave nodes 20 and 21 are termed Route#5 and the link from the slave node 22 to the slave node 18 is termed Route#7.

The method in accordance with the present invention requires each of the slave nodes 12 to 22 to know and store only one piece of routing information for use when sending a data packet to the master node 10, this piece of information is the address of next node on the network to which messages for the master device should be passed. As a consequence the storage of routing information is distributed thus requiring relatively small amount of memory for routing information in each slave node. A slave node initiating the transmission of a message will include a header in the data packet containing the address of the next node in the routing table. However as the message progresses from node to node, the header becomes longer due to the inclusion of the addresses of successive nodes in the routing table.

When the master node wishes to send a message to a slave node, it includes the addresses of all the slave nodes on the route to the destination slave node. As the data packet progresses from slave node to slave node, the address of the transmitting slave node is deleted thus making the header shorter and the data packet inherently more reliable.

Figure 2:
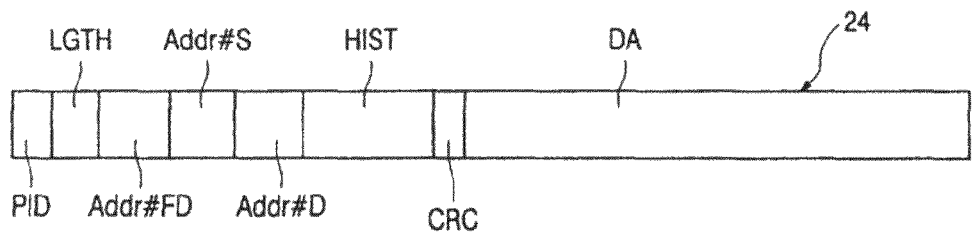
FIG. 2 is a diagrammatic representation of a data packet sent by a slave node.

FIG. 2 illustrates an example of a data packet 24 which may be sent over a link VL to the master device. The data packet 24 comprises eight fields beginning with a packet identity PID, packet length LGTH, address of the final destination Addr#FD which in the case of the network shown in FIG. 1 will be the address of the master device or node Addr#O, address of the source (S) node Addr#S, address of the next destination (D) node Addr#D, history HIST which is the address(es) of the slave nodes through which the data packet has been passed, cyclic redundancy check bits CRC and a data field DA. The CRC field may be located after the data field. As an example consider the slave node 20 sending a data packet to the master device 10 on an uplink and the master device responding on a downlink. For the first uplink hop, the master address field will be Addr#O, the source node address will be Addr#9, the destination node will be Addr#5 and the history field HIST will be empty. At the slave device 16, the destination node will be changed to Addr#2 and Addr#5 is inserted into the HIST field and the data packet is transmitted on the next uplink hop. At the slave node 13, the destination node will be changed to Addr#O and Addr#2 will be appended to the content of the HIST field and the data packet is forwarded to the master device 10. The respective messages may be locally handshaked at all the slave nodes through which they are passed.

Figure 3:
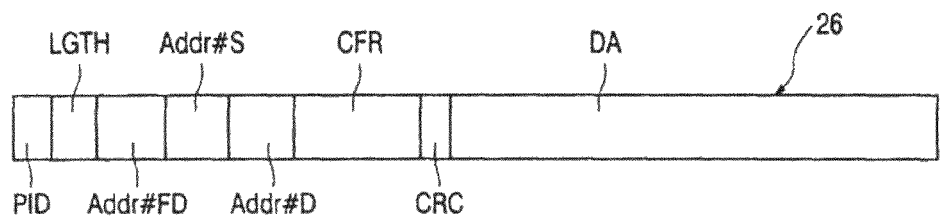
FIG. 3 is a diagrammatic representation of a data packet sent by a master node.

FIG. 3 illustrates an example of a data packet 26 which may be sent by the master device to a slave node. The data packet has eight fields all of which apart from Complete Future Route CFR, which replaces HIST in the uplink data packet shown in FIG. 2, are the same as those shown in FIG. 2 and accordingly will not be described again. The field CFR contains the addresses of all the slave nodes which will be used on the downlink transmission and which have been derived from a routing table stored in master device 10. At the commencement of the master device 10 sending the data packet to the slave node 20, the final destination address Addr#FD is Addr#9, the source address Addr#S is master address Addr#O, the next destination address Addr#D is the address of the next hop Addr#2, and the CFR field contains Addr#5 and Addr#9. At the slave node 13, the Addr#2 is replaced by Addr#5 and Addr#5 is deleted in the CFR field. At the slave node 16, Addr#9 replaces Addr#5 in the destination field and Addr#9 is deleted from the CFR field which becomes empty.

Thus in the case of a wireless network for providing notification of street lamp failure to a central control station, each street lamp is monitored by a slave node and information about a lamp failure ripples through the network to the master device 10.

Each slave node has a unique address. If the network includes an address server then on installation, the user could request that the unique address be replaced by a more user friendly unique radio address which can be shorter and will therefore be more economical to transmit.

In order to enable the network to change dynamically to take into account slave nodes, such as street lamps, joining or leaving the network, various options are possible. In the case of a new slave station being installed and not having any routing information pre-stored in it apart from its own unique address, it issues a message to all those slave devices in range requesting information on routing to the master device 10. The in-range slave devices respond to this message by passing back information relating to their first hop of a route to the master device. This information can additionally include other data such as the number of subsequent hops before a data packet reaches the master device, the loading on the route to the master device, the reliability of the route to the master device and factors relating directly to the slave nodes and their desire to be used to pass messages, for example that a slave node is battery powered and for battery economy reasons would prefer not to pass messages.

A processor in the new slave node can select a preferred route to the master device based on the number of hops, desired reliability and effective loading having regard to its own message rate. However the only information that it needs to store locally is the address of the first slave node in the route to the master device 10 and, if desired, sufficient information about the route that a further slave node added to the network can select a route in a similar manner. Once the new slave node has established its preferred routing to the master device 10 it is now in a position to offer the service of a route to the master device. It sends a network change message to the master device 10 stating that it has joined the network.

Another option which is possible is for a slave node to review its route to the master device 10 and then reconfigure itself if the existing route is no longer optimal because slave nodes have been added or removed.

In the event of a change to the network, a network change message is broadcast and a slave node on receipt of this message has the option of re-evaluating its routing decision based on the new information. In this mode, the slave node is free to alter its decision accordingly. If a slave node makes a decision to alter its route to the master device, it informs all those slave nodes which rely on it for their route so that they can then re-evaluate their routing. By this process of constant re-evaluation, a network can be maintained over a period of time even though it is changing in structure.

When a new slave node is first installed it issues a "request route to master" message. It will initially transmit zero as the allowable number of hops. The only node which can respond to this message is master device itself. Assuming that the master device is not within earshot the new slave node will not receive any responses. The new slave node will then try again with an increased value of allowable hops which allows the slave nodes on the network to respond if they meet the criteria. It will carry on this process until it receives a response. The response will inform the new slave node of the slave address to use as the first hop in its route to the master. To confirm the route to the master and also inform the master of the new slave node's presence, the new slave node will issue a "ping" to the master device using its own unique address, typically 48 bits long. The master device will then update its routing table and reply with a "pong" confirming the validity of the route and the address of the master device it should communicate with in the event of there being more than one master device or network. On receipt of the pong the new slave node knows that it has a valid registered route to the master device and can now commence attempting to connect to its allocated master device (assuming they are not the same device). The new slave node then issues an "indicate route to master" message to inform neighboring slave nodes of the fact that it has a route to the master, and is then in the position to offer the service of a route to the master device. Slave nodes local to the new slave node, on receipt of an "indicate route to master" message may re-evaluate their own route to the master device.

If a slave node decides to change its route, it will confirm the new route by sending a ping to the master device. This process is carried out in the same way as before. Once the new-slave node has joined the network it is then in a position to offer the service of a route to the master device itself. Irrespective of the process of adding a new slave node to the network all the slave nodes on the network will have stored the first hop of the route back to the master device. A message to the master device will ripple through the network from slave node to slave node using the routing information stored in each node as it passes through. In contrast to network management messages, which must contain the entire route history on reaching the master device, this information does not need to be included for a data packet, leading to a shorter message.

By constructing a "Complete Future Route" (CFR) a master can send a message to any slave node in the network. The master will use the routing table which it has learnt to construct the CFR. If the master with which the new device should communicate with is different to that of the address server then the device will again issue a request route to master message but this time give the actual master address it is seeking. The process is carried out in exactly the same way as before.

Figure 4:
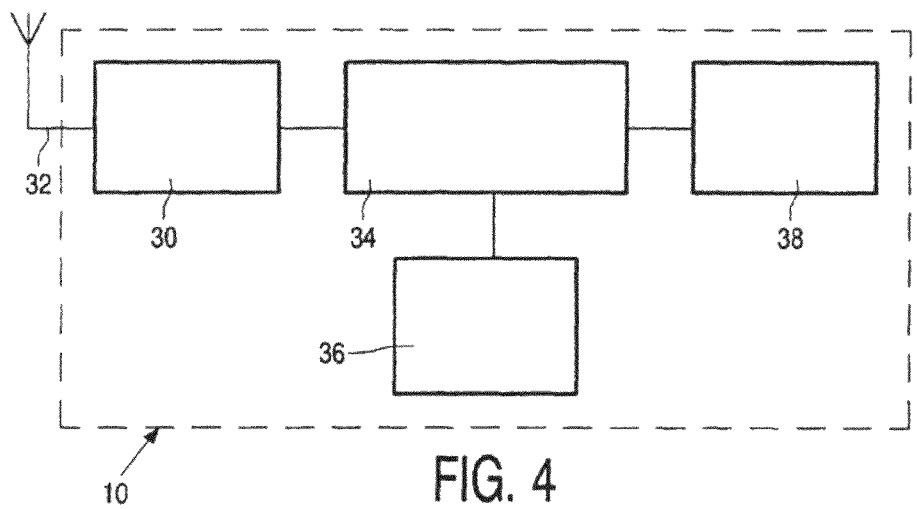
FIG. 4 is a block schematic diagram of a master device.

Referring to FIG. 4 the master device 10 comprises a transceiver 30 coupled on one hand to an antenna 32 and on the other hand to a processor 34 which controls the operation of the master device 10 in accordance with software stored in a ROM 36. A RAM 38 stores routing data which is supplied to the processor as required depending on the current network architecture which is updated dynamically by slave nodes joining or leaving the network and by slave nodes determining a new optimum route following alterations, including breakdowns and repairs, to the network.

Figure 5:
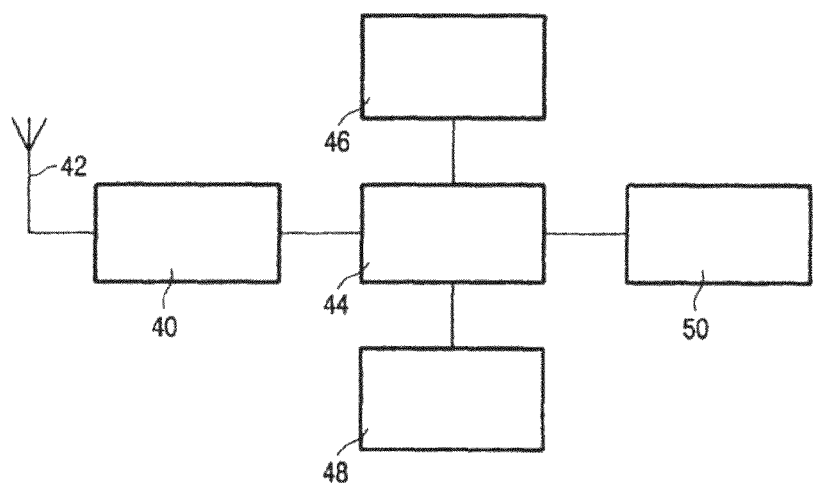
FIG. 5 is a block schematic diagram of a slave device.

Referring to FIG. 5, a slave node comprises a transceiver 40 coupled on the one hand to an antenna 42 and on the other hand to a microprocessor 44 which controls the operation of the slave node in accordance with software stored in a ROM 46. Another ROM 48 storing the address of the slave node is coupled to the processor 44. Lastly a RAM 50 storing the address of the next slave node in the route to the master device 10 or the address of the master device 10 if it is the final station on the route.

In the present specification and claims the word "a" or "an" preceding an element does not exclude the presence of a plurality of such elements. Further the word "comprising" does not exclude the presence of other elements or steps than those listed. From reading the present disclosure, other modifications will be apparent to persons skilled in the art. Such modifications may involve other features which are already known in the design, manufacture and use of master-slave distributed communications networks and component parts therefor and which may be used instead of or in addition to features already described herein.

INDUSTRIAL APPLICABILITY

Wireless master-slave distributed communications networks.

The invention claimed is:

1. A master-slave distributed communications network comprising:
   a master node; and
   a plurality of slave nodes, the master node and the slave nodes being operatively interconnected,
   wherein each slave node has a memory configured to store as uplink routing information only an address of a next node in a route of a message to the master node, and
   wherein each slave node is configured to read-out the address of the next node from the memory, add the address of the next node in a destination field of an uplink data packet of the message, and forward the uplink data packet to the next node.

2. The network of claim 1, wherein each slave node is configured to delete its address which is present in a downlink data packet originating from the master node and received by the slave station and transmit the downlink data packet to a next slave node based on an address of the next slave node included in the downlink data packet.

3. The network of claim 1, wherein each data, packet contains a destination field with space for a single destination address, and each data packet received by a node contains the address of the node in the destination field, and each intermediate slave node in a route is configured to delete its own address from the destination field of a received data packet and to substitute the address of the next node in the route into the destination field, and to transmit the data packet to the next node in the route.

4. The master-slave distributed communications network of claim 1, wherein the plurality of slave nodes includes at least one indirectly connected slave node to the master node, the at least one indirectly connected slave node storing, in a respective memory uplink addressing information for passing a transmission to the master node, only the address of the next node in a selected uplink route to the master node.

5. The master-slave distributed communications network of claim 1, wherein the plurality of slave nodes includes at least one indirectly connected slave node to the master node, and wherein the master node includes in a downlink data packet to be transmitted to the at least one indirectly connected slave node an address of each intermediate slave node in the selected route.

6. The master-slave distributed communications network of claim 5, wherein each the intermediate slave node comprises a transceiver for receiving the downlink data packet, removing from the data packet the address of the intermediate slave node from which the data packet was received thereby forming an altered data packet, and transmitting the altered data packet.

7. The master-slave distributed communications network of claim 1, wherein the plurality of slave nodes includes at least one indirectly connected slave node to the master node, and wherein the at least one indirectly connected slave comprises means for requesting uplink routing information from in-range slave nodes, receiving said routing information, and determining which of the in-range slave nodes is a preferred next node in a selected route to the master node.

8. The master-slave distributed communications network of claim 1, wherein the plurality of slave nodes includes at least one indirectly connected slave node to the master node, and wherein the at least one indirectly connected slave node comprises means for reexamining a pre-existing route to the master node and, in response to finding that said preexisting uplink route does not comply with a route reliability criterion, selecting a new route that complies with the route reliability criterion.

9. The master-slave distributed communications network of claim 1, wherein the plurality of slave nodes includes at least one indirectly connected slave node to the master node, and wherein the at least one indirectly connected slave node comprises a transceiver for transmitting a message containing a number of hops set to a predetermined minimum value and, in response to not receiving a reply, repeating the transmission of the message with the number of hops increased in value.

10. A method of operating a master-slave distributed network comprising a master node and a plurality of slave nodes, the master node and the slave nodes being operatively interconnected, the method comprising the acts of:
    storing in a memory of each slave node as uplink routing information only an address of a next node in a route of an uplink data packet to the master node;
    reading-out the address of the next node from the memory by a slave node wishing to send the data packet to the master node;
    adding the address of the next node into a destination field of the data packet of the message, and
    transmitting the uplink data packet to the next node.

11. The method of claim 10, further comprising the acts of:
    the master node adding the addresses of all the slave nodes on a route to a final destination slave node in a further downlink data packet to be transmitted; and
    transmitting the further downlink data packet by the master node.

12. The method of claim 11, further comprising the acts of:
    receiving the further downlink data packet by an intermediate slave node, the further downlink data packet including an address of the intermediate slave node and addresses of remaining slave nodes in a route to the final destination slave node including an address of a next node in the route to the final destination slave node;
    deleting by the intermediate slave node an address of the intermediate slave node which is present in a downlink data packet originating from the master node to form a modified downlink data packet; and
    transmitting the modified downlink data packet by the intermediate slave node to a next slave node based on the address of the next slave node included in the modified downlink data packet.

13. The method of claim 10, further comprising the acts of:
    receiving the further downlink data packet by a slave node;
    removing by the slave node its own address from the data packet to form an altered downlink data packet; and
    transmitting the altered downlink data packet.

14. The method of claim 10, further comprising the acts of:
    a new slave node transmitting an invitation message requesting routing information from in-range slave nodes;
    receiving by the new slave node routing information;
    determining by the new slave node which of in-range slave nodes is a preferred next node in an uplink route from the new slave node to the master node; and
    storing an address of the preferred next node in the memory of the new slave node.

15. The method of a claim 10, further comprising the acts of:
    after an alteration in the network, re-examining by slave nodes their uplink routes to the master node; and
    in response to one slave node finding that its uplink, route does not comply with predetermined routing criteria, the one slave node setting-up a new uplink route by determining which of in-range nodes is a preferred next node in an uplink route from the slave node to the master node and storing the address of the preferred next node in the memory of the one slave node.

16. The method of claim 10, further comprising the acts of:
    a new slave node transmitting a "request route to master" message with a number of hops set to a predetermined minimum value; and
    in response to not receiving a reply, repeating transmission of the "request route to master" message with the number of hops increased in value.

17. The method of claim 10, wherein
    when a source slave node transmits an uplink data packet for routing through zero or more intermediate slave nodes to a master node, the uplink data packet contains: a destination field containing a single destination address of the next node in the route, and a history field to record the addresses of nodes in the route, and
    at each intermediate node in the route, when the intermediate node receives the uplink data packet, the intermediate node deletes its own address from the destination field and substitutes the address of a pre-stored preferred next node as the single destination address in the destination field, and copies its own address to the history field.

18. A slave station for use as a slave node in a master-slave distributed communications network including a master node and a plurality of slave nodes, the slave station comprising:
    transceiving means for communicating with at least one of: the master node and one of the plurality of slave nodes;
    first memory means for storing the address of the slave station;
    second memory means for storing as routing information only an address of the next node in an uplink route to the master node; and
    processing means coupled to the transceiving means and the first and second memory means for adding the address of the said next node to a destination field of an uplink data packet to be routed to the master node.

19. The slave station of claim 18, wherein the processing means is configured to delete the address of the slave station which is present in the destination field of a downlink data packet originating from the master node and received by the slave station.

20. The slave station of claim 18, wherein the slave station is configured to process data packets as a final destination node when the address of the slave station is the only address contained in the routing information of the data packet.

21. A master station for use in a master-slave distributed communications network including the master station and a plurality of slave stations, the master station comprising:
transceiving means for communicating with at least one of the plurality of slave stations,
memory means for storing routing data, and
processing means for compiling routing information from the stored routing data and for adding the compiled routing information to a downlink data packet originating from the master station and destined to a final destination slave station, the routing information comprising an address of the final destination slave station and an address of each intermediate slave station through which the data packet will be passed, wherein each intermediate slave station is configured to delete its address which is present in the routing information and transmit the data packet to a next intermediate slave node in a route to the final destination slave station based on the routing information.

22. A master-slave distributed communications network comprising:
a master node; and
a plurality of slave nodes, the master node and the slave nodes being operatively interconnected,
wherein each slave node comprises:
a transceiver configured to receive a downlink data packet from the master node including an address of the slave node; and
a processor configured to delete the address of the slave node present in the downlink data packet thus forming a modified downlink data packet, and
wherein the transceiver is further configured to transmit the modified downlink data packet to a further slave node.

23. A method of operating a master-slave distributed network comprising a master node and a plurality of slave nodes, the master node and the slave nodes being operatively interconnected, the method comprising the acts of:
receiving by an intermediate slave node a downlink data packet in a route from the master node to a final destination slave node;
removing by the intermediate slave node its own address from the downlink data packet to form an altered downlink data packet; and
transmitting the altered downlink data packet in a route to the to the final destination slave node.

24. The method of claim 23, wherein:
when the master node transmits the downlink data packet for routing through zero or more intermediate slave nodes to the final destination slave node, the downlink data packet includes: a destination field containing a single destination address of the next node in the route, and a routing field containing a plurality of node addresses defining the route subsequent to the next node in the route, and when the master node initially transmits the data packet, the destination field contains the next node in the route after the master node and the routing field initially contains the addresses of the final destination slave node and all the intermediate slave nodes in the route, except the next node in the route after the master node is not included in the initial routing field, and
at each intermediate slave node in the route, when the intermediate slave node receives the downlink data packet, the intermediate node deletes its own address from the destination field and substitutes the address of the next node from the routing field as the single destination address of the destination field, and also deletes the address of the next node in the route from the routing field.

25. A slave station for use as a slave node in a master-slave distributed communications network including a master node and a plurality of slave nodes, the slave station comprising:
a transceiver configured to receive a downlink data packet routed from the master node, the downlink data packet including an address of the slave station; and
a processor configured to delete the address of the slave station present in the data packet thus forming a modified downlink data packet; and
wherein the transceiver is further configured to transmit the modified downlink data packet to a further slave station depending on a next address included in the downlink data packet.

26. A master station for use in a master-slave distributed communications network including the master station and a plurality of slave stations, the master station comprising:
a transceiver configured to communicate with the plurality of slave stations;
a memory configured to store routing data; and
a processor configured to compile routing information from the stored routing data and to add the compiled routing information to a downlink data packet, the routing information comprising an address of a final destination slave station and an address of each intermediate slave station through which the data packet will be passed in a route to the final destination slave station, wherein each intermediate slave station receiving a downlink data packet originating from the master node and destined to the final destination slave station is configured to delete its address which is present in the routing information and transmit the downlink data packet to a next intermediate slave station in the route to the final destination slave station based on the routing information.

27. A distributed wireless communications network comprising:
a primary node functioning as a master node; and
a plurality of secondary nodes,
wherein the primary node and the respective secondary nodes are operatively interconnected with at least a first of the secondary nodes being directly operatively interconnected with the primary node and at least a second of the secondary nodes being indirectly operatively interconnected with the primary node using the first node of the secondary nodes between the second of the secondary nodes and the primary node,
wherein the primary node has a primary memory configured to store routing data relating to the wireless communications network, and
wherein each of the secondary nodes has a memory configured to store as uplink routing information only an address of the next node in a route of an uplink data packet to the primary node, and a processor responsive to receiving the uplink data packet from a secondary node, configured to read-out the address of the next node from the secondary memory, and configured to replace its own address with the address of the next node in a destination field of the uplink data packet and forwarding the data packet to the next node.

28. The network of claim 27, wherein the node address of the secondary node receiving the uplink data packet is placed in a history field of the uplink data packet.

29. A method of operating a distributed wireless network comprising a primary node and a plurality of secondary nodes, wherein the primary node and the respective secondary nodes are operatively interconnected with at least one of the secondary nodes being directly operatively interconnected with the primary node and at least a second of the secondary nodes being indirectly operatively interconnected with the primary node using the first of the secondary nodes between the second of the secondary nodes and the primary node, and wherein the primary node stores routing data relating to the network, the method comprising the acts of:

each of the secondary nodes storing in a memory as uplink routing information only the address of the next node in a route of an uplink data packet to the primary node;
in response to receiving the uplink data packet from a secondary node, reading-out the address of the next node from the memory;
replacing its own node address with the address of the next node in a destination field of the uplink data packet; and
forwarding the uplink data packet to the said next node.

30. The method of claim 29, further comprising the act of, a secondary node in response to receiving the uplink data packet, deleting its own node address from the destination field and adding its own node address into a history field of the data packet.

31. The method of claim 29, further comprising the acts of:
supplying by the primary node a routing field initially containing node addresses of the secondary nodes used in the rout of a downlink data packet to a final destination node, except the next node in the route after the primary node is not included in the initial routing field; and
receiving by an intermediate secondary node a downlink data packet, removing its own address from the destination field, removing the node address of the next downlink node from the routing field, adding node address of the next downlink node to the destination field, and forwarding an altered data packet to the next following secondary node as stored in the routing field.

32. The method of claim 29, further comprising the act of:
transmitting by a new secondary node an invitation message requesting uplink routing information from in-range secondary nodes;
the new secondary node receiving routing information from the in-range secondary-nodes and determining which of the in-range secondary nodes is a preferred next node in the route of a data packet to the primary node;
storing the address of the preferred in-range secondary node depending on the determination.

33. A secondary node for use as a source/routing node in a distributed wireless communications network comprising a primary node functioning as a master node and a plurality of secondary nodes, wherein the primary node and the respective plurality of secondary nodes are operatively interconnected with at least a first one of the plurality of secondary nodes being directly operatively interconnected with the primary node and at least a second one of the plurality of secondary nodes being indirectly operatively interconnected with the primary node using the first one of the plurality of secondary nodes between the second one of the secondary nodes and the primary node, the secondary node comprising:

a transceiver configured to communicate with at least one of: the primary node, and at least one of the plurality of secondary nodes,
a memory configured to store as uplink routing information only an address of a next node in a route of a data packet to the primary node; and
a processor, responsive to receiving an uplink data packet from the secondary node, configured to read the address of the next node from the memory, copy the address of the next node into a destination field of the data packet, and forward the data packet to the next node.

34. The secondary node of claim 33, wherein the uplink data packet contains a history field containing addresses of all intermediate nodes that the packet has passed through on an uplink route to the master node, and the processor upon receiving the uplink data packet from a secondary node is configured to add the node address of the secondary node to the history field of the data packet.

35. The secondary node of claim 33, wherein a downlink data packet comprises a routing field containing node addresses of the subsequent secondary nodes used on the downlink transmission, except the address of the next node following secondary node in the route after the secondary node, and wherein the processor is further configured, in response to receiving the downlink data packet, to remove the address of a further next following secondary node from the routing field to create an altered data packet and forward the altered data packet to the next following secondary node included in the routing field.

36. A method of operating a distributed radio communications network comprising a plurality of nodes operatively connected for communication, said plurality of nodes including a master node for receiving an uplink transmission, a slave node for sending the uplink transmission to the master node through at least one intermediate node, said method comprising the act of: said slave node selecting the uplink route for passage of the transmission to the master node on the basis of a route reliability criterion.

37. The method of claim 36, said slave node selecting said uplink route for passage of the transmission to the master node on the basis of information received from said at least one intermediate node that is relevant to said route reliability criterion.

38. The method of claim 36, said slave node and each of the at least one intermediate nodes in the selected route, storing in respective memories, as necessary addressing information for passing the transmission to the master node, only the address of the next node in said selected uplink route to said master node.

39. The method of claim 36, said slave node basing said uplink route selection at least in part on at least one of the criteria: number of hops from node to node until the transmission reaches the master node, route power limitations, and route loading.

40. The method of claim 36, said slave node comprising a new node to be added to said network.

41. The method of claim 36, said slave node comprising an existing node re-evaluating an established route.

42. A station for operating as a uplink route selection node in a distributed radio communications network including a plurality of nodes operatively connected for communication, said plurality of nodes including a master node for receiving an uplink transmission, a slave node for sending the uplink transmission to the master node through at least one intermediate node, the station comprising: a transceiver for communicating with other nodes, said uplink route selection node being capable of operating as one of the slave or intermediate nodes, and a processor for selecting a next node of a plurality of nodes in a uplink route for passage of the uplink transmission to the master node on the basis of a route reliability criterion.

43. The station of claim 42, the uplink route selection node selecting said next node in the uplink route for passage of the uplink transmission to the master node on the basis of received information that is relevant to said route reliability criterion.

44. The station of claim 42, the uplink route selection node having a memory for storing, as necessary addressing information for passing the uplink transmission to the master node, only the address of the next uplink node in said selected route to said master node.

45. The station of claim 42, the uplink route selection node basing said uplink route selection at least in part on at least one of the criteria: number of hops from node to node until the uplink transmission reaches the master node, route power limitations, and route loading.

46. The station of claim 42, the uplink route selection node comprising a new node added to said network.

47. The station of claim 42, said uplink route selection node comprising an existing node for re-evaluating an established route.

48. The station of claim 42, said uplink route selection node having the capability, when operating as an intermediate node, of adding to routing information of a received uplink message the address of a next node on a route to the master node, and transmitting the altered message to the next node on the route.

49. The station of claim 42, said master node being configured to transmit downlink messages, said uplink route selection node having the capability, when operating as an intermediate node, of removing from routing information in a received downlink message, the address of the route selection node, and transmitting the altered message to the next node on the route.

50. The station of claim 49, where an origin of the received message is a master node.

51. A non-transitory computer readable medium having a program for interacting with a processor for performing a method of operating a master-slave distributed network comprising a master node and a plurality of slave nodes, the master node and the slave nodes being operatively interconnected, the method comprising the acts of:
    storing in a memory of each slave node as uplink routing information only an address of a next node in a route of an uplink data packet to the master node;
    reading-out the address of the next node from the memory by a slave node wishing to send the uplink data packet to the master node;
    adding the address of the next node into a destination field of the uplink data packet of the message, and
    transmitting the uplink data packet to the next node.

52. A non-transitory computer readable medium having a program for interacting with a processor for performing a method of operating a master-slave distributed network comprising a master node and a plurality of slave nodes, the master node and the slave nodes being operatively interconnected, the method comprising the acts of:
    receiving by an intermediate slave node a downlink data packet in a route from the master node to a final destination slave node;
    removing by the intermediate slave node its own address from the downlink data packet to form an altered downlink data packet; and
    transmitting the altered downlink data packet in a route to the to the final destination slave node.

53. A method for operating a master-slave distributed communications network comprising a master node and a plurality of slave nodes operatively connected with the master node, wherein said plurality of slave nodes include at least one intermediate slave node and at least one indirectly connected slave node connected with the master node via a selected uplink route via said at least one intermediate slave node, said method comprising the acts of:
    examining reliability of available uplink routes from said at least one indirectly connected slave node to said master node;
    selecting the selected uplink route from the available routes based on the reliability of the available routes;
    the at least one indirectly connected slave node comparing the reliability of available uplink routes to a route reliability criterion;
    the at least one indirectly connected slave node re-examining a pre-existing uplink route to the master node; and
    in response to finding that said pre-existing route does not comply with the route reliability criterion, selects a new route that does comply with the route reliability criterion.

54. The method of claim 53, wherein at least one indirectly connected slave node comprises a memory, said method comprising the additional act of storing in the memory, addressing information for a next node in the selected uplink route.

55. The method of claim 53, comprising the additional act of transmitting from the master node a downlink data packet to the at least one indirectly connected slave node, the downlink data packet including an address of the at least one intermediate slave node.

56. The method of claim 55, comprising the additional acts of:
    receiving the downlink data packet in another intermediate slave node;
    removing from the downlink data packet the address of the at least one intermediate slave node thereby altering the downlink data packet; and
    transmitting the altered downlink data packet from the another intermediate slave node to the next node in a route to the at least one indirectly connected slave node.

57. The method of claim 53, comprising the additional acts of:
    the at least one indirectly connected slave node requesting uplink routing information from other in-range slave nodes; and
    upon receiving the uplink routing information, the at least one indirectly connected slave node determining which of the in-range slave nodes is a preferred next node in the selected uplink route to the master node.

58. A method for operating a master-slave distributed communications network comprising a master node and a plurality of slave nodes operatively connected with the master node, wherein said plurality of slave nodes include at least one intermediate slave node and at least one indirectly connected slave node connected with the master node via a selected uplink route via said at least one intermediate slave node, said method comprising the acts of:
    examining reliability of available uplink routes from said at least one indirectly connected slave node to said master node; and
    selecting the selected uplink route from the available routes based on the reliability of the available routes, wherein the at least one indirectly connected slave comprises a new slave node, the method comprising the following additional acts:

said new slave node transmitting a "request route to master" message with a number of hops set to a predetermined minimum value; and in response to not receiving a reply, repeating the transmission of the "request route to master" message with the number of hops increased in value.

* * * * *